US011990592B2

(12) United States Patent
Xu et al.

(10) Patent No.: US 11,990,592 B2
(45) Date of Patent: May 21, 2024

(54) BATTERY, APPARATUS USING BATTERY, AND MANUFACTURING METHOD AND MANUFACTURING DEVICE OF BATTERY

(71) Applicant: CONTEMPORARY AMPEREX TECHNOLOGY CO., LIMITED, Ningde (CN)

(72) Inventors: Xiaofu Xu, Ningde (CN); Yonghuang Ye, Ningde (CN); Haizu Jin, Ningde (CN); Chengdu Liang, Ningde (CN); Wenwei Chen, Ningde (CN); Quanguo Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/985,851

(22) Filed: Nov. 12, 2022

(65) Prior Publication Data
US 2023/0076751 A1 Mar. 9, 2023

Related U.S. Application Data

(63) Continuation of application No. PCT/CN2020/129475, filed on Nov. 17, 2020.

(51) Int. Cl.
*H01M 10/617* (2014.01)
*H01M 10/04* (2006.01)
*H01M 10/647* (2014.01)
*H01M 10/6556* (2014.01)

(52) U.S. Cl.
CPC ......... *H01M 10/617* (2015.04); *H01M 10/04* (2013.01); *H01M 10/647* (2015.04); *H01M 10/6556* (2015.04); *H01M 2220/20* (2013.01)

(58) Field of Classification Search
CPC .. H01M 10/617; H01M 10/04; H01M 10/647; H01M 10/6556; H01M 2220/20; H01M 10/6554; Y02E 60/10
See application file for complete search history.

(56) References Cited

U.S. PATENT DOCUMENTS

| | | | |
|---|---|---|---|
| 8,993,140 | B2 | 3/2015 | Schiemann et al. |
| 9,083,065 | B2 | 7/2015 | Carkner |
| 9,799,873 | B2 | 10/2017 | Kohlberger |
| 9,882,197 | B2 | 1/2018 | Wang et al. |
| 10,128,528 | B2 | 11/2018 | Zhang et al. |
| 10,153,636 | B1 | 12/2018 | Vander Lind et al. |
| 10,177,423 | B2 | 1/2019 | Heeg et al. |
| 10,434,894 | B2 | 10/2019 | Li et al. |
| 10,587,001 | B2 | 3/2020 | Park |
| 10,673,103 | B2 | 6/2020 | Hoshina et al. |
| 10,907,981 | B2 | 2/2021 | Li et al. |
| 2003/0068557 | A1 | 4/2003 | Kumashiro et al. |
| 2006/0197496 | A1 | 9/2006 | Iijima et al. |
| 2007/0072059 | A1 | 3/2007 | Kitao et al. |
| 2008/0067972 | A1 | 3/2008 | Takami et al. |
| 2008/0241666 | A1 | 10/2008 | Baba et al. |
| 2009/0162751 | A1 | 6/2009 | Honbo et al. |
| 2010/0136391 | A1 | 6/2010 | Prilutsky et al. |
| 2010/0304206 | A1 | 12/2010 | Nakashima et al. |
| 2011/0086248 | A1 | 4/2011 | Nakura |
| 2012/0074894 | A1 | 3/2012 | Chen et al. |
| 2012/0126753 | A1 | 5/2012 | Carkner et al. |
| 2012/0164490 | A1 | 6/2012 | Itoi et al. |
| 2012/0189885 | A1 | 7/2012 | Kishii et al. |
| 2013/0337310 | A1 | 12/2013 | Omura et al. |
| 2014/0020235 | A1 | 1/2014 | Aramaki et al. |
| 2014/0087227 | A1 | 3/2014 | Shih et al. |
| 2014/0181551 | A1 | 6/2014 | Rahal-Arabi et al. |
| 2014/0186659 | A1 | 7/2014 | Dhar et al. |
| 2014/0342216 | A1 | 11/2014 | Kohlberger |

(Continued)

FOREIGN PATENT DOCUMENTS

| | | |
|---|---|---|
| CN | 101262049 A | 9/2008 |
| CN | 101409369 A | 4/2009 |

(Continued)

OTHER PUBLICATIONS

The World Intellectual Property Organization (WIPO) International Search Report and Written Opinion for PCT/CN2020/129475 dated Aug. 16, 2021 13 pages (including English translation).
The China National Intellectual Property Administration (CNIPA) The First Office Action for Chinese Application 202010786523.0 dated Oct. 24, 2022 17 Pages (With Translation).
The China National Intellectual Property Administration (CNIPA) The Second Office Action for Chinese Application 202010786523.9 dated Feb. 28, 2023 10 Pages (With Translation).
The China National Intellectual Property Administration (CNIPA) The First Office Action for Chinese Application 202010786641.X dated Oct. 26, 2022 16 Pages (With Translation).
The European Patent Office (EPO) Extended Search Report for EP Application No. 20947010.3 dated Jan. 25, 2023 9 Pages.

(Continued)

*Primary Examiner* — Muhammad S Siddiquee
(74) *Attorney, Agent, or Firm* — ANOVA LAW GROUP, PLLC

(57) ABSTRACT

Embodiments of this application provide a battery, an apparatus using a battery, and a manufacturing method and a manufacturing device of battery. The battery includes a battery cell and a thermal management component. The battery cell has a side wall and a bottom wall that are connected to each other. The thermal management component is configured to accommodate fluid to regulate temperature of the battery cell, where an accommodating portion is provided on the thermal management component, and configured to accommodate the battery cell, and the accommodating portion is attached to the bottom wall and side wall of the battery cell, to enable heat transfer between the battery cell and the thermal management component. The battery cell in the battery provided in the embodiments of this application can dissipate heat efficiently.

8 Claims, 9 Drawing Sheets

(56) References Cited

U.S. PATENT DOCUMENTS

| | | | |
|---|---|---|---|
| 2015/0132625 | A1 | 5/2015 | Miyata et al. |
| 2015/0188188 | A1 | 7/2015 | Zhang et al. |
| 2015/0188207 | A1 | 7/2015 | Son et al. |
| 2015/0280276 | A1 | 10/2015 | Lemke et al. |
| 2015/0300538 | A1 | 10/2015 | Al-Atat et al. |
| 2015/0303444 | A1 | 10/2015 | Wang et al. |
| 2015/0357687 | A1* | 12/2015 | Heeg .................. H01M 10/653 165/80.4 |
| 2015/0357688 | A1* | 12/2015 | Heeg .................. H01M 10/625 165/80.4 |
| 2015/0372359 | A1 | 12/2015 | Shih et al. |
| 2016/0099451 | A1 | 4/2016 | Murai et al. |
| 2016/0126546 | A1 | 5/2016 | Takami et al. |
| 2016/0200214 | A1 | 7/2016 | Ishibashi et al. |
| 2016/0301045 | A1 | 10/2016 | Tyler et al. |
| 2016/0329617 | A1 | 11/2016 | Omura et al. |
| 2016/0380315 | A1 | 12/2016 | Weicker et al. |
| 2017/0179535 | A1 | 6/2017 | Murashi et al. |
| 2017/0346089 | A1 | 11/2017 | Yamamoto et al. |
| 2017/0365886 | A1 | 12/2017 | Hoshina et al. |
| 2018/0034023 | A1 | 2/2018 | Newman et al. |
| 2018/0138478 | A1 | 5/2018 | Chan |
| 2018/0145383 | A1 | 5/2018 | Krishnan et al. |
| 2018/0159101 | A1 | 6/2018 | Tsang et al. |
| 2018/0212458 | A1 | 7/2018 | Kawai et al. |
| 2018/0217218 | A1 | 8/2018 | Huang et al. |
| 2019/0067658 | A1 | 2/2019 | Fujiwara et al. |
| 2019/0074560 | A1 | 3/2019 | Reimer et al. |
| 2019/0103625 | A1 | 4/2019 | Haraguchi et al. |
| 2019/0225093 | A1 | 7/2019 | Li et al. |
| 2019/0226859 | A1 | 7/2019 | Li et al. |
| 2019/0267686 | A1 | 8/2019 | Shimizu et al. |
| 2019/0334143 | A1 | 10/2019 | Sugeno |
| 2020/0014000 | A1 | 1/2020 | Roddy et al. |
| 2020/0058968 | A1 | 2/2020 | Thompson et al. |
| 2020/0106126 | A1 | 4/2020 | Yokoshima et al. |
| 2020/0130511 | A1 | 4/2020 | Botts et al. |
| 2020/0212526 | A1 | 7/2020 | Wu et al. |
| 2020/0313255 | A1* | 10/2020 | Wu ........................ B60H 1/323 |
| 2020/0321568 | A1 | 10/2020 | Roddy et al. |
| 2021/0025723 | A1 | 1/2021 | Li et al. |
| 2021/0050635 | A1 | 2/2021 | Lee et al. |
| 2021/0074979 | A1 | 3/2021 | Kwak et al. |
| 2021/0091428 | A1 | 3/2021 | Naito et al. |
| 2021/0104798 | A1 | 4/2021 | Jiang et al. |
| 2021/0104801 | A1 | 4/2021 | Chu et al. |
| 2021/0296721 | A1 | 9/2021 | Omura et al. |
| 2021/0328281 | A1 | 10/2021 | Chu et al. |
| 2021/0391619 | A1 | 12/2021 | Chang et al. |
| 2021/0391628 | A1 | 12/2021 | Hattendorff et al. |
| 2022/0069406 | A1 | 3/2022 | Roddy et al. |
| 2022/0123375 | A1 | 4/2022 | Liang et al. |
| 2022/0123427 | A1 | 4/2022 | Ren et al. |
| 2022/0416330 | A1 | 12/2022 | Li et al. |
| 2023/0061760 | A1 | 3/2023 | Li et al. |
| 2023/0070894 | A1 | 3/2023 | Li et al. |
| 2023/0163296 | A1 | 5/2023 | Li et al. |
| 2023/0187756 | A1 | 6/2023 | Chu et al. |

FOREIGN PATENT DOCUMENTS

| | | | |
|---|---|---|---|
| CN | 101504977 | A | 8/2009 |
| CN | 101635372 | A | 1/2010 |
| CN | 101675555 | A | 3/2010 |
| CN | 201749897 | U | 2/2011 |
| CN | 102027617 | A | 4/2011 |
| CN | 102447301 | A | 5/2012 |
| CN | 202308227 | U | 7/2012 |
| CN | 101242011 | B | 9/2012 |
| CN | 103311562 | A | 9/2013 |
| CN | 104126238 | A | 10/2014 |
| CN | 104979503 | A | 10/2015 |
| CN | 105006586 | A | 10/2015 |
| CN | 105186066 | A | 12/2015 |
| CN | 105849968 | A | 8/2016 |
| CN | 105914804 | A | 8/2016 |
| CN | 106207016 | A | 12/2016 |
| CN | 206225503 | U | 6/2017 |
| CN | 107004920 | A | 8/2017 |
| CN | 107112603 | A | 8/2017 |
| CN | 107256971 | A | 10/2017 |
| CN | 206567773 | U | 10/2017 |
| CN | 108598598 | A | 9/2018 |
| CN | 208507849 | U | 2/2019 |
| CN | 109428114 | A | 3/2019 |
| CN | 208674305 | U | 3/2019 |
| CN | 109659465 | A | 4/2019 |
| CN | 110048151 | A | 7/2019 |
| CN | 110065414 | A | 7/2019 |
| CN | 110071236 | A | 7/2019 |
| CN | 209071461 | U | 7/2019 |
| CN | 110265591 | A | 9/2019 |
| CN | 110265627 | A | 9/2019 |
| CN | 110380144 | A | 10/2019 |
| CN | 110444835 | A | 11/2019 |
| CN | 110456275 | A | 11/2019 |
| CN | 110678393 | A | 1/2020 |
| CN | 210040332 | U | 2/2020 |
| CN | 21040385 | U | 4/2020 |
| CN | 111106277 | A | 5/2020 |
| CN | 111106278 | A | 5/2020 |
| CN | 111446488 | A | 7/2020 |
| CN | 111584792 | A | 8/2020 |
| CN | 211295236 | U | 8/2020 |
| CN | 111668408 | A | 9/2020 |
| CN | 111668409 | A | 9/2020 |
| CN | 211629259 | U | 10/2020 |
| CN | 111900294 | A | 11/2020 |
| DE | 102012215495 | A1 | 3/2014 |
| DE | 202017104111 | U1 | 10/2018 |
| DE | 102017212223 | A1 | 1/2019 |
| EP | 1265302 | A2 | 12/2002 |
| EP | 3193402 | A1 | 7/2017 |
| EP | 3261161 | A1 | 12/2017 |
| EP | 3316391 | A1 | 5/2018 |
| EP | 3358706 | A1 | 8/2018 |
| EP | 3675218 | A1 | 7/2020 |
| EP | 3926724 | A2 | 12/2021 |
| JP | H07320775 | A | 12/1995 |
| JP | 2003174734 | A | 6/2003 |
| JP | 2004342580 | A | 12/2004 |
| JP | 2005071917 | A | 3/2005 |
| JP | 2007059145 | A | 3/2007 |
| JP | 2008226518 | A | 9/2008 |
| JP | 2009021223 | A | 1/2009 |
| JP | 2010250984 | A | 11/2010 |
| JP | 2011065906 | A | 3/2011 |
| JP | 2012113899 | A | 6/2012 |
| JP | 2012234696 | A | 11/2012 |
| JP | 2013509688 | A | 3/2013 |
| JP | 2013209688 | A | 10/2013 |
| JP | 2014072025 | A | 4/2014 |
| JP | 2014112463 | A | 6/2014 |
| JP | 2015018706 | A | 1/2015 |
| JP | 2015133169 | A | 7/2015 |
| JP | 2015170591 | A | 9/2015 |
| JP | 2015530858 | A | 10/2015 |
| JP | 2015204247 | A | 11/2015 |
| JP | 2015211025 | A | 11/2015 |
| JP | 2017139844 | A | 8/2017 |
| JP | 2019129149 | A | 8/2019 |
| JP | 2019139879 | A | 8/2019 |
| JP | 2020035692 | A | 3/2020 |
| JP | 2020527848 | A | 9/2020 |
| JP | 2023509197 | A | 3/2023 |
| JP | 2023509198 | A | 3/2023 |
| WO | 2004095611 | A1 | 11/2004 |
| WO | 2009113281 | A1 | 9/2009 |
| WO | 2011114349 | A2 | 9/2011 |
| WO | 2012014418 | A1 | 2/2012 |
| WO | 2012060031 | A1 | 5/2012 |
| WO | 2013031613 | A1 | 3/2013 |
| WO | 2013069308 | A1 | 5/2013 |

(56) References Cited

FOREIGN PATENT DOCUMENTS

| WO | 2013099293 A1 | 7/2013 |
|---|---|---|
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020053251 A1 | 3/2020 |
| WO | 2020133659 A1 | 7/2020 |
| WO | 2020133660 A1 | 7/2020 |
| WO | 2020134054 A1 | 7/2020 |
| WO | 2020135152 A1 | 7/2020 |
| WO | 2022067808 A1 | 4/2022 |
| WO | 2022067809 A1 | 4/2022 |
| WO | 2022067810 A1 | 4/2022 |

OTHER PUBLICATIONS

The European Patent Office (EPO) Extended Search Report for EP Application No. 20955830.3 dated Mar. 30, 2023 8 Pages.
The European Patent Office (EPO) Extended Search Report for EP Application No. 21789597.9 dated Nov. 16, 2022 11 Pages.
The European Patent Office (EPO) Extended Search Report for EP Application No. 21789597.8 dated Aug. 12, 2022 13 Pages.
The European Patent Office (EPO) Extended Search Report for EP Application No. 21790065.3 dated Nov. 18, 2022 11 Pages.
The European Patent Office (EPO) Extended Search Report for EP Application No. 21790065.3 dated Aug. 18, 2022 13 Pages.
"Particle size analysis—Laser diffraction methods", Feb. 26, 2016. GB/T 19077-2016/ ISO 13320:2009.
The India Intellectual Proprty Office (INPO) Examination Report for IN Application No. 202217009095 dated Dec. 16, 2022 6 Pages.
Chengyi LIN et al., "General rules for analytical scanning electron microscopy", Jan. 23, 1997. JY/T 010-1996.
The European Patent Office (EPO) Extended Search Report for EP Application No. 20947817.1 dated Nov. 30, 2022 7 Pages.
The World Intellectual Property Organization (WIPO) International Search Report and Written Opinion for PCT/CN2020/105474 dated Apr. 26, 2021 15 pages (including English translation).
The World Intellectual Property Organization (WIPO) International Search Report and Written Opinion for PCT/CN2020/119736 dated Apr. 28, 2021 17 pages (including English translation).
The World Intellectual Property Organization (WIPO) International Search Report and Written Opinion for PCT/CN2020/119737 dated Jul. 2, 2021 15 pages (including English translation).
The World Intellectual Property Organization (WIPO) International Search Report and Written Opinion for PCT/CN2020/119738 dated Jun. 25, 2021 17 pages (including English translation).
The World Intellectual Property Organization (WIPO) International Search Report and Written Opinion for PCT/CN2020/139180 dated Sep. 29, 2021 13 pages (including English translation).
The World Intellectual Property Organization (WIPO) International Search Report and Written Opinion for PCT/CN2021/089319 dated Jul. 26, 2021 14 pages (including English translation).
The World Intellectual Property Organization (WIPO) International Search Report and Written Opinion for PCT/CN2021/089665 dated Jul. 30, 2021 17 pages (including English translation).
The World Intellectual Property Organization (WIPO) International Search Report and Written Opinion for PCT/CN2021/109686 dated Apr. 25, 2022 12 pages (including English translation).
The United States Patent and Trademark Office (USPTO) The office action for U.S. Appl. No. 17/985,813 dated Mar. 8, 2023 21 Pages.
The United States Patent and Trademark Office (USPTO) The office action for U.S. Appl. No. 17/985,813 dated Jun. 14, 2023 19 Pages.
The United States Patent and Trademark Office (USPTO) The office action for U.S. Appl. No. 18/053,493 dated Mar. 9, 2023 33 Pages.
The United States Patent and Trademark Office (USPTO) The office action for U.S. Appl. No. 18/149,672 dated May 30, 2023 7 Pages.
The United States Patent and Trademark Office (USPTO) The Application for U.S. Appl. No. 18/054,375, filed Nov. 10, 2022 44 Pages.
The United States Patent and Trademark Office (USPTO) The Application for U.S. Appl. No. 17/970,603, filed Oct. 21, 2022 51 Pages.
The China National Intellectual Property Administration (CNIPA) the First Office Action for CN Application No. 202080054687.0 Jul. 24, 2023 14 Pages (Including English translation).
The United States Patent and Trademark Office (USPTO) The Non-final Office Action for U.S. Appl. No. 17/970,603, filed Jul. 19, 2023 19 Pages.
Japan Patent Office (JPO) The Notice of Reasons for Refusal For JP Application No. 2022-542009 Sep. 4, 2023 6 Pages (Translation Included).
The China National Intellectual Property Administration (CNIPA) Notice of the First Office Action for CN Application No. 202080054659.9 Jun. 24, 2023 14 Pages (Including English translation).
The United States Patent and Trademark Office (USPTO) The Non-final Office Action for U.S. Appl. No. 18/054,375, filed Aug. 24, 2023 41 Pages.
The European Patent Office (EPO) The Extended Search Report for EP Application No. 20961838.8 Aug. 17, 2023 10 Pages.
The United States Patent and Trademark Office (USPTO) The Final Office Action for U.S. Appl. No. 17/975,813, filed Aug. 9, 2023 49 Pages.
The European Patent Office (EPO) The Extended Search Report for EP Application No. 21937198.6 Aug. 14, 2023 7 Pages.
Japan Patent Office (JPO) The Office Action for JP Application No. 2022-539699 Jul. 31, 2023 8 Pages (Translation Included).
United States Patent and Trademark Office (USPTO) Notice of Allowance for U.S. Appl. No. 17/985,813 Dec. 12, 2023 17 Pages.
The European Patent Office (EPO) Extended Search Report for EP Application No. 20955828.7 Sep. 27, 2023 6 Pages.
Japan Patent Office (JPO) The Notice of Reasons for Refusal For JP Application No. 2022-542013 Oct. 2, 2023 9 Pages (Translation Included).
The Japan Patent Office (JPO) Notification of Reasons for Refusal for Application No. 2022-539699 Jan. 29, 2024 9 Pages(including translation).
United States Patent and Trademark Office (USPTO) Non-final office action for U.S. Appl. No. 18/053,493, filed Jan. 29, 2024 39 Pages.
The Japan Patent Office (JPO) Notification of Reasons for Refusal for Application No. 2022-542009 Feb. 5, 2024 8 Pages(including translation).
The Japan Patent Office (JPO) Decision to Grant a Patent for Application No. 2022-542013 Mar. 18, 2024 6 Pages (including translation).
United States Patent and Trademark Office (USPTO) Notice of Allowance for U.S. Appl. No. 17/985,813, filed Feb. 22, 2024 12 Pages.
The European Patent Office (EPO) The Extended European Search Report for Application No. 20955829.5 Mar. 25, 2024 8 Pages.

\* cited by examiner

BATTERY, APPARATUS USING BATTERY, AND MANUFACTURING METHOD AND MANUFACTURING DEVICE OF BATTERY

CROSS REFERENCE TO RELATED APPLICATION

This application is a continuation application of International Patent Application No. PCT/CN2020/129475, filed with China National Intellectual Property Administration on Nov. 17, 2020, which is incorporated herein by reference in its entirety.

TECHNICAL FIELD

This application relates to the field of battery technologies, and in particular, to a battery, an apparatus using a battery, and a manufacturing method and a manufacturing device of batteries.

BACKGROUND

Apparatuses such as automobiles, electric bicycles, ships, and energy storage cabinets include batteries. The batteries provide electrical energy for the apparatuses.

A battery includes a plurality of battery cells and a box body. The plurality of battery cells are arranged in sequence, and the box body encloses the plurality of battery cells and protects the plurality of battery cells. The box body is provided with positive and negative electrodes, and each battery cell is connected to the positive and negative electrodes. When the battery is working, active substances inside the battery cells react chemically with electrolyte to provide electrical energy for a load.

When the battery is working, each battery cell may generate heat, leading a temperature rise. However, when the battery cell is unable to dissipate heat in a timely manner, the battery cell has a relatively high temperature, and the battery may be damaged by heat.

SUMMARY

In view of the foregoing problem, embodiments of this application provide a battery, an apparatus using a battery, and a manufacturing method and a manufacturing device of battery, so as to dissipate heat of a battery cell in the battery in a timely manner, and prevent the battery from being damaged by heat.

In order to achieve the foregoing objectives, the embodiments of this application provide the following technical solutions.

A first aspect of the embodiments of this application provides a battery. The battery includes a battery cell, where the battery cell has a side wall and a bottom wall that are connected to each other; and a thermal management component, configured to accommodate fluid to regulate temperature of the battery cell, where an accommodating portion is provided on the thermal management component, the accommodating portion is configured to accommodate the battery cell, and the accommodating portion is attached to the bottom wall and side wall of the battery cell, to implement heat transfer between the battery cell and the thermal management component.

In some implementations, the battery cells are provided in plurality, and the plurality of battery cells include at least a first battery cell and a second battery cell that are arranged adjacently, and temperature of the first battery cell is higher than temperature of the second battery cell before heat transfer; and the accommodating portion is attached to a bottom wall and a side wall of the first battery cell, and thermal management component is attached to a bottom wall of the second battery cell.

In some implementations, a first flow channel and a second flow channel are provided on the thermal management component. The first flow channel and the second flow channel are separately configured to accommodate the fluid. The first flow channel and the second flow channel are isolated from each other, and the first flow channel and the second flow channel are provided opposite the first battery cell and the second battery cell, respectively.

In some implementations, the fluid includes first fluid and second fluid. The first fluid circulates in the first flow channel, the second fluid circulates in the second flow channel, and a thermal conductivity coefficient of the first fluid is greater than a thermal conductivity coefficient of the second fluid.

In some implementations, the thermal management component further includes a protruding portion, and the protruding portion is attached to the bottom wall of the second battery cell. The first flow channel is provided in the accommodating portion, and the second flow channel is provided in the protruding portion.

In some implementations, the battery further includes a support member. The support member is configured to support the battery cell, and the support member is connected to the thermal management component.

In some implementations, an accommodating groove is provided in the thermal management component, and the accommodating groove is configured to accommodate the support member.

The battery in the embodiments of this application has the following advantages over the conventional technology: the battery includes a plurality of battery cells and a thermal management component. The thermal management component is configured to regulate temperature of the plurality of battery cells by using fluid. An accommodating portion is provided on the thermal management component, and part of a battery cell extends into and supports the accommodating portion. In this way, the battery cell can transfer heat with a side wall and a bottom wall of the accommodating portion simultaneously. A heat transfer area between the battery cell and the thermal management component is relatively large, so that the battery cell can dissipate heat in a timely manner to prevent the battery from being damaged by heat.

A second aspect of the embodiments of this application provides an apparatus using a battery. The apparatus includes the battery according to the first aspect. The battery provides electrical energy for the apparatus.

A third aspect of the embodiments of this application provides a manufacturing method of battery, to manufacture the battery according to the first aspect. The method includes: providing a battery cell, where the battery cell has a side wall and a bottom wall that are connected to each other; providing a thermal management component, and forming an accommodating portion on the thermal management component; assembling the battery cell and the thermal management component, where the accommodating portion is attached to the bottom wall and side wall of the battery cell, to implement heat transfer between the battery cell and the thermal management component.

A fourth aspect of the embodiments of this application provides a preparation device of battery, configured to prepare the battery according to the first aspect. The device includes: a battery cell preparation module, configured to prepare the battery cell; a thermal management component preparation module, configured to prepare the thermal management component, and form an accommodating portion on the thermal management component; and an assembling module, configured to install the battery cell in the accommodating portion of the thermal management component.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
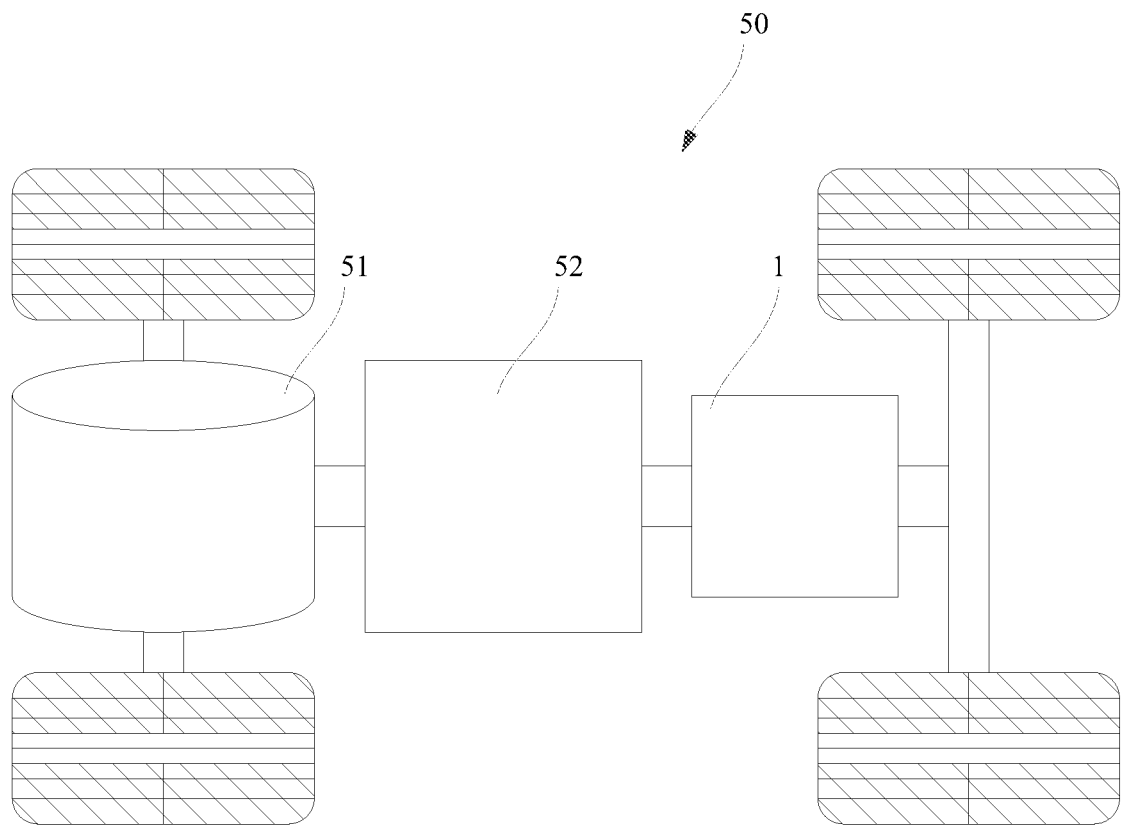
FIG. 1 is a schematic structural diagram of an apparatus using a battery according to an embodiment of this application.

In the accompanying drawings, the figures are not drawn to scale.

REFERENCE SIGNS 1. battery;
10. battery cell; 11. side wall; 12. bottom wall; 101. first battery cell; 102. second battery cell; 13. electrode assembly; 131. positive tab; 132. negative tab; 14. positive electrode terminal; 15. negative electrode terminal; 16. housing;
20. thermal management component; 21. accommodating portion; 22. first flow channel; 23. second flow channel; 24. protruding portion; 25. accommodating groove;
30. support member;
40. protective box; 41. side panel;
50. vehicle; 51. drive mechanism; 52. control mechanism.

DETAILED DESCRIPTION OF EMBODIMENTS

The following further describes the embodiments of this application in detail with reference to the accompanying drawings and implementations. The detailed description and accompanying drawings of the following embodiments are used to exemplarily illustrate the principle of this application, but cannot be intended to limit the scope of this application, that is, this application is not limited to the described embodiments.

In the descriptions of this application, it should be noted that, unless otherwise stated, "plurality" means two or more; and the orientations or positional relationships indicated by the terms "upper", "lower", "left", "right", "inside", "outside", and the like are merely intended to facilitate the descriptions of this application and simplify the descriptions other than indicate or imply that the apparatuses or components must have specific orientations, or be constructed and operated for a specific orientation, and therefore shall not be construed as a limitation to this application. In addition, the terms such as "first", "second", and "third" are merely intended for a purpose of description, and shall not be understood as an indication or implication of relative importance. "Vertical" is not strictly vertical, but within an allowable range of error. "Parallel" is not strictly parallel, but within an allowable range of error.

The orientation terms appearing in the following description are all directions shown in the figures, and do not limit the specific structure of the application. In the descriptions of this application, it should be further noted that unless otherwise specified and defined explicitly, the terms "installment", "link", "connection" and "attach" should be understood in their general senses. For example, the terms may be a fixed connection, a detachable connection, or an integrated connection, or may be a direct connection, or an indirect connection through an intermediate medium. A person of ordinary skill in the art can understand specific meanings of these terms in this application based on specific situations.

In the conventional technology, a battery cell transfers heat with a thermal management component, so as to regulate temperature of the battery cell. However, heat transfer between the battery cell and the thermal management component is only implemented through a bottom wall of the battery cell. A heat transfer area between the battery cell and the thermal management component is relatively small, the battery cell cannot dissipate heat in a timely manner, and a battery may be easily damaged by heat.

In view of this, in the embodiments of this application, an accommodating portion is provided on a thermal management component, so that part of a battery cell or the entire battery cell extends into the accommodating portion. In this way, heat transfer is implemented between the battery cell and the thermal management component through a bottom wall and at least part of a side wall of the battery cell. A heat transfer area between the battery cell and the thermal management component is relatively large, heat transfer performance is better, and the battery cell can dissipate heat and be cooled in a timely manner to prevent the battery from being damaged by heat.

FIG. 1 is a schematic structural diagram of an apparatus using a battery according to an embodiment of this application. Referring to FIG. 1, this embodiment of this application provides an apparatus using a battery. The apparatus may be a mobile device such as a vehicle, a ship, and a small aircraft, or may be a non-mobile device capable of supplying electrical energy, such as an energy storage cabinet. Using the vehicle as an example, the vehicle may be a new energy vehicle, where the new energy vehicle may be a battery electric vehicle, a hybrid electric vehicle, a range-extended vehicle, or the like. A vehicle 50 may include a drive mechanism 51, a control mechanism 52, and a battery 1. The control mechanism 52 is electrically connected to the drive mechanism 51, and is configured to control start and stop of the drive mechanism 51 based on needs, so as to drive or park the vehicle 50. The battery 1 is electrically connected to the control mechanism 52, and is configured to supply electrical energy to the control mechanism 52. Power-consuming components in the vehicle 50 may also include a sounding device and the like.

Figure 2:
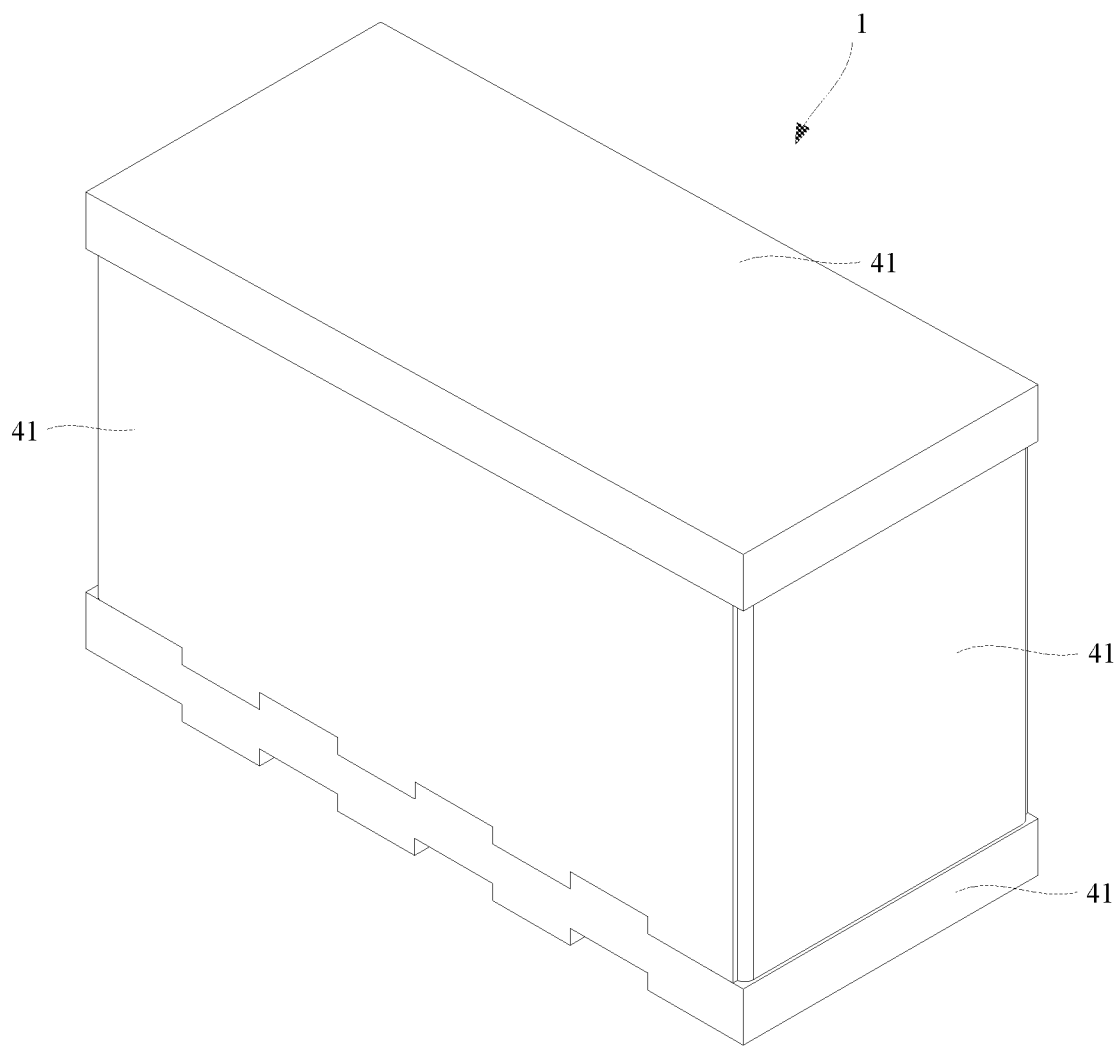
FIG. 2 is a first schematic structural diagram of a battery according to an embodiment of this application.
Figure 3:
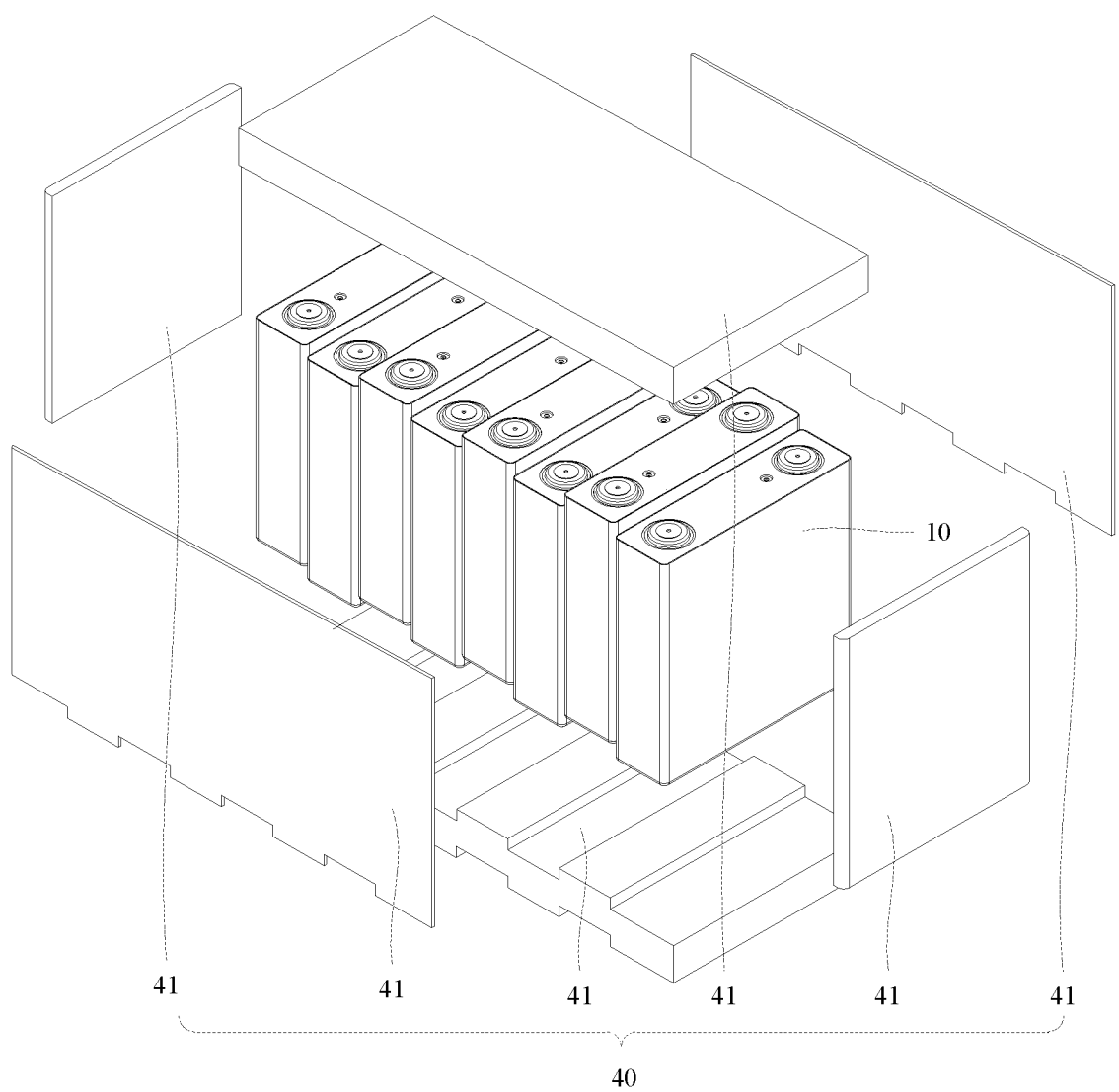
FIG. 3 is an exploded view of FIG. 2.
Figure 4:
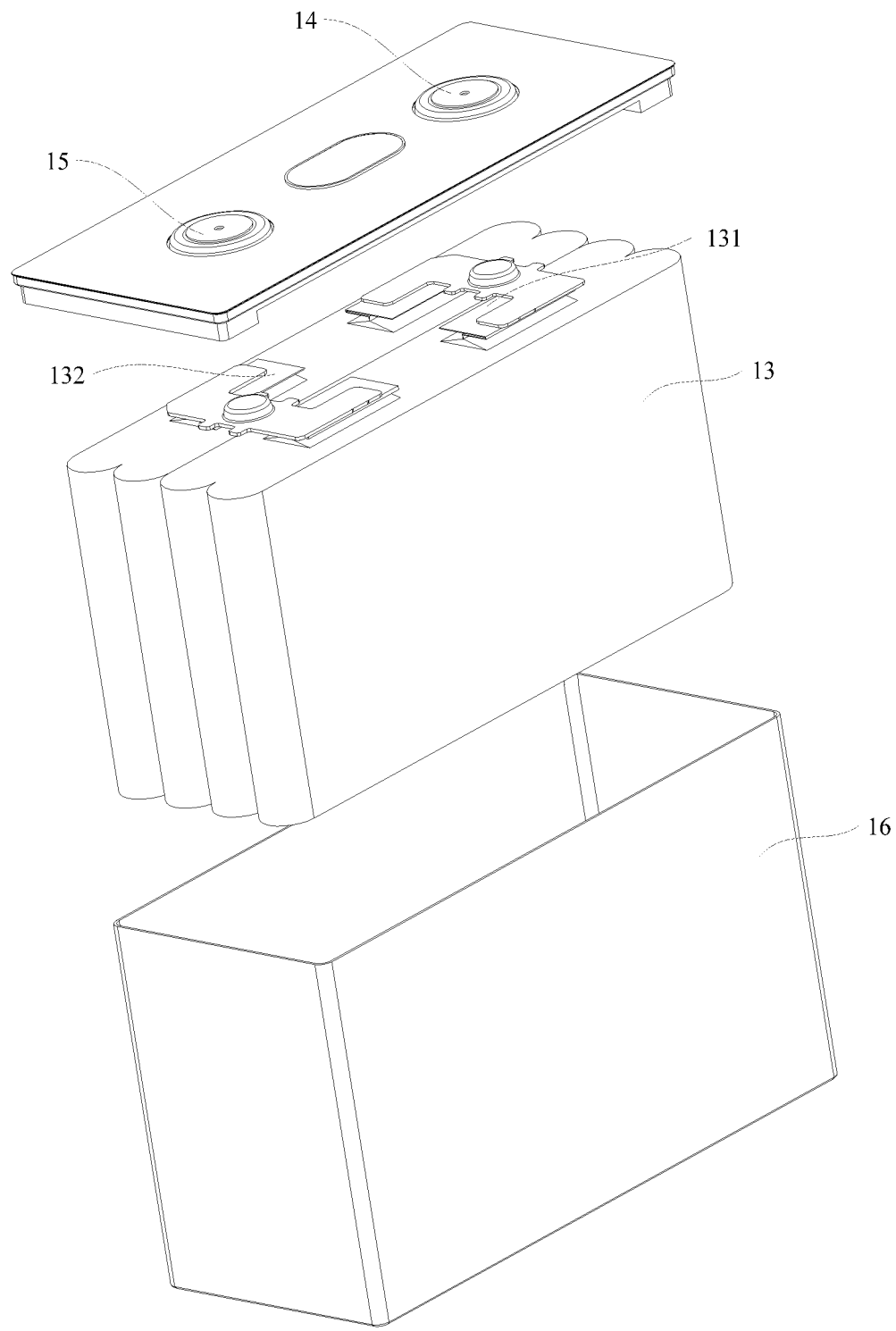
FIG. 4 is a schematic structural diagram of a battery cell in FIG. 3.
Figure 5:
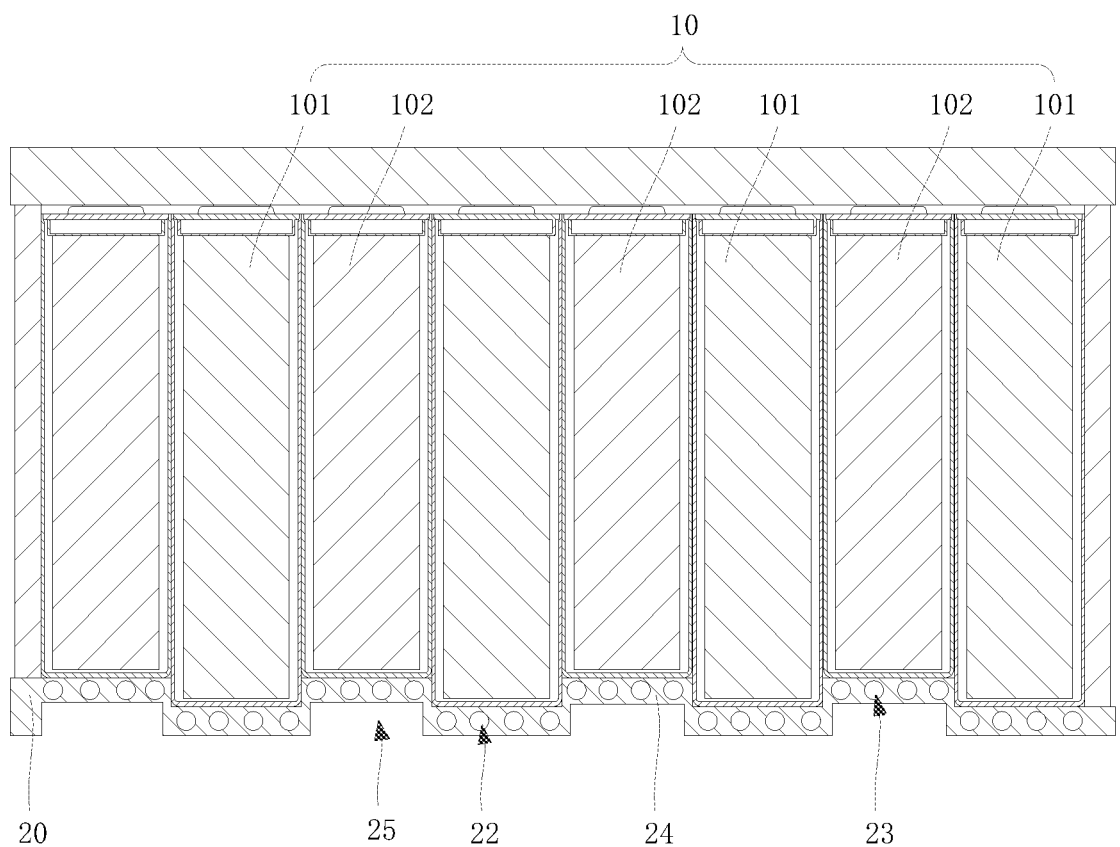
FIG. 5 is a second schematic structural diagram of a battery according to an embodiment of this application.
Figure 6:
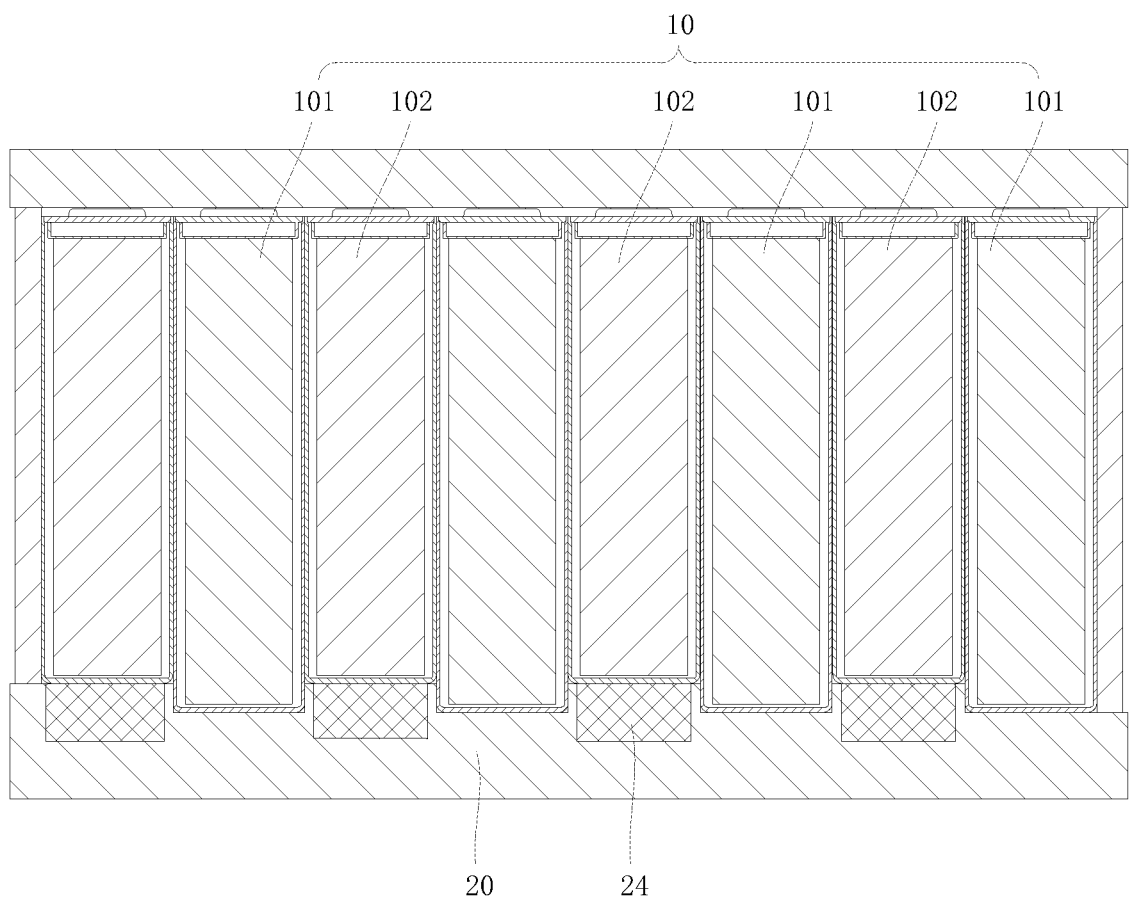
FIG. 6 is a third schematic structural diagram of a battery according to an embodiment of this application.
Figure 7:
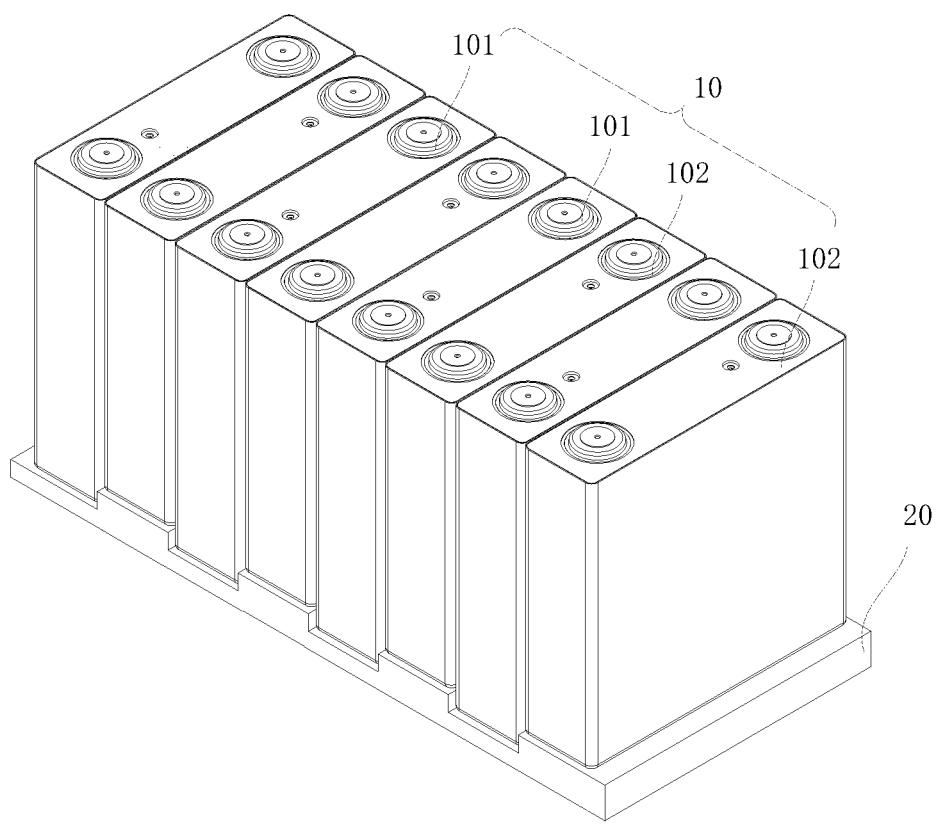
FIG. 7 is a schematic structural diagram of a battery cell and a thermal management component according to an embodiment of this application.
Figure 8:
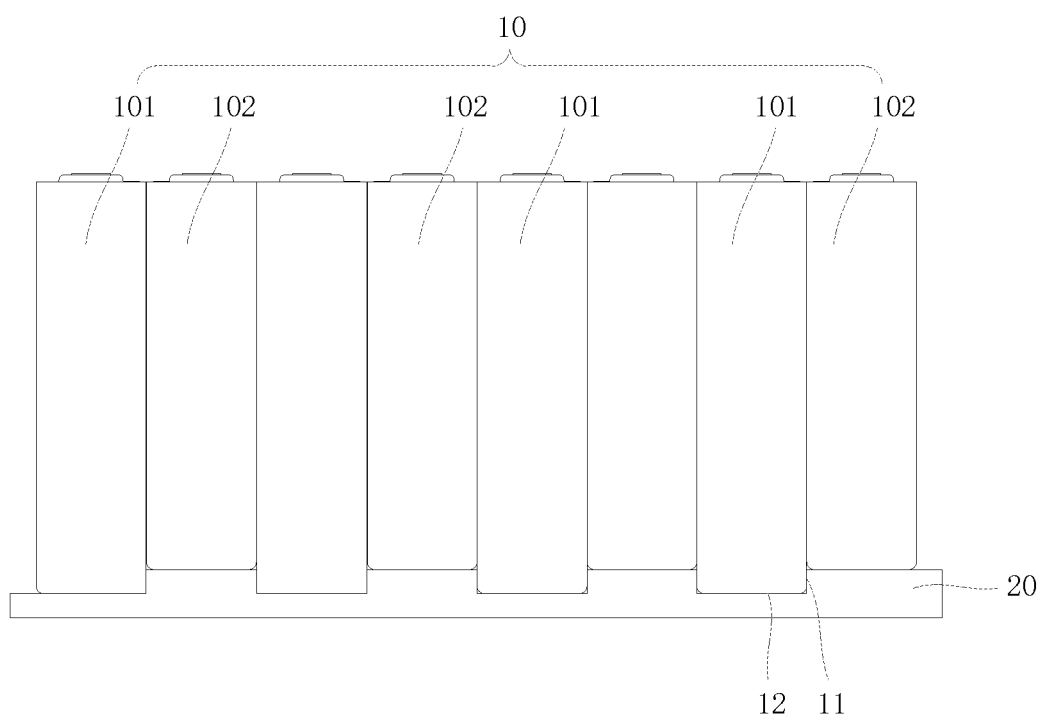
FIG. 8 is a side view of FIG. 7.
Figure 9:
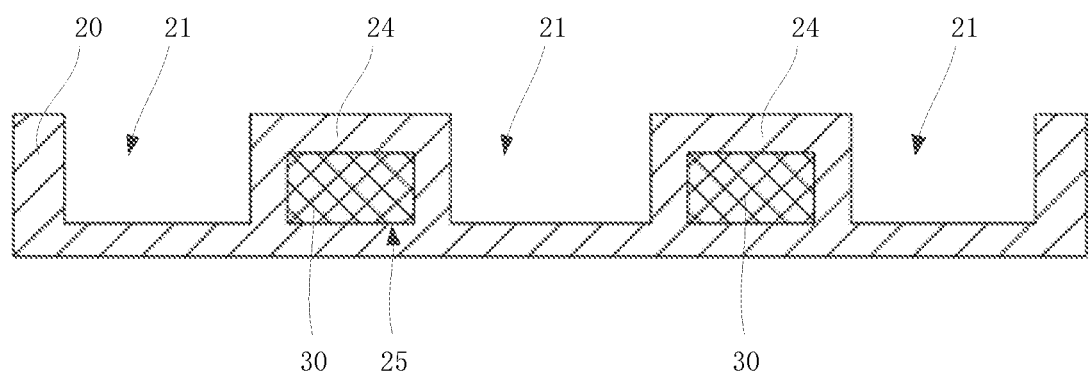
FIG. 9 is a first schematic structural diagram of a thermal management component according to an embodiment of this application.
Figure 10:
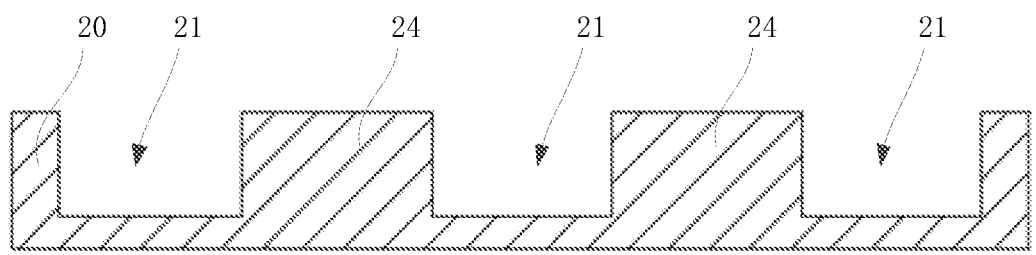
FIG. 10 is a second schematic structural diagram of a thermal management component according to an embodiment of this application.

FIG. 2 is a first schematic structural diagram of a battery according to an embodiment of this application. FIG. 3 is an exploded view of FIG. 2. FIG. 4 is a schematic structural diagram of a battery cell in FIG. 3. FIG. 5 is a second schematic structural diagram of a battery according to an embodiment of this application. FIG. 6 is a third schematic structural diagram of a battery according to an embodiment of this application. FIG. 7 is a schematic structural diagram of a battery cell and a thermal management component according to an embodiment of this application. FIG. 8 is a side view of FIG. 7. FIG. 9 is a first schematic structural diagram of a thermal management component according to an embodiment of this application. FIG. 10 is a second schematic structural diagram of a thermal management component according to an embodiment of this application.

Referring to FIG. 2 to FIG. 10, in some implementations, a battery 1 includes: a battery cell 10, where the battery cell 10 has a side wall 11 and a bottom wall 12 that are connected; a thermal management component 20, configured to accommodate fluid to regulate temperature of the battery cell 10, where an accommodating portion 21 is provided on the thermal management component 20, the accommodating portion 21 is configured to accommodate the battery cell 10, and the accommodating portion 21 is attached to the bottom wall 12 and the side wall 11 of the battery cell 10, to implement heat transfer between the battery cell 10 and the thermal management component 20.

Specifically, referring to FIG. 4, a structure of the battery cell 10 may have a structure well known to persons skilled in the art. The battery cell 10 in this application may include a lithium-ion secondary battery, lithium-ion primary batteries, lithium-sulfur batteries, a sodium/lithium-ion battery, a sodium-ion battery, a magnesium-ion battery, or the like, which are not limited in the embodiments of this application. The battery cell 10 may be cylinder-shaped, flat-shaped, cuboid-shaped or in other shapes, which is also not limited in the embodiments of this application. The battery cells 10 are typically divided into three types by packaging method: a cylinder cell, a prismatic cell, and a pouch cell, which is also not limited in the embodiments of this application.

The battery cell 10 typically includes an electrode assembly 13 and an electrolyte (not shown). The electrode assembly 13 includes a positive electrode plate, a negative electrode plate, and a separator disposed between the positive electrode plate and the negative electrode plate. Operation of the battery cell 10 mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer protrudes out of a current collector coated with the positive electrode active substance layer, and the current collector uncoated with the positive electrode active substance layer is used as a positive tab 131. Using a lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer protrudes out of a current collector coated with the negative electrode active substance layer, and the current collector uncoated with the negative electrode active substance layer is used as a negative tab 132. A material of the negative electrode current collector may be copper, and the negative electrode active substance may be carbon, silicon, or the like. To allow a large current to pass through without fusing, a plurality of positive tabs 131 are provided and stacked together, and a plurality of negative tabs 132 are provided and stacked together. A material of the separator may be polypropylene (PP for short), polyethylene (PE for short), or the like. In addition, the electrode assembly 13 may have a winding structure or a laminated structure. There may be one or more electrode assemblies 13, and the specific quantity is not limited in the embodiments of this application.

The battery cell 10 also includes a housing 16. The electrode assembly 13 and the electrolyte are all packaged in the housing 16. The housing 16 may be a hollow cuboid, cube or cylinder. A material of the housing 16 may be aluminum, steel, or alloy thereof, or may be plastic or aluminum plastic film. A positive electrode terminal 14 and a negative electrode terminal 15 are also provided on the housing 16. The positive tab 131 is electrically connected to the positive electrode terminal 14, and the negative tab 132 is electrically connected to the negative electrode terminal 15 to output electrical energy.

Referring to FIG. 3 and FIG. 5 to FIG. 10, the battery 1 further includes a thermal management component 20. The thermal management component 20 is configured to accommodate fluid, to regulate temperature of the battery cell 10. Regulating temperature may include heating or cooling the battery cell 10. For example, when cooling or lowering the temperature of the battery cell 10, the thermal management component 20 is configured to accommodate cooling fluid, to lower temperature of the battery cell 10. In this case, the thermal management component 20 may also be referred to as a cooling component, a cooling system, a cooling plate, or the like. The fluid accommodated in the thermal management component may also be referred to as a cooling medium or cooling fluid. The cooling medium may be designed to be circulating, so as to achieve a better temperature regulation effect. In addition, the thermal management component 20 may also be configured for heating, so as to raise temperature of the battery cell 10. For example, in some areas with cold weather in winter, heating the battery cell 10 before starting the electric vehicle can improve the performance of the battery cell 10. To ensure the effectiveness of temperature regulation, the thermal management component 20 is usually attached to the battery cell 10 through thermally conductive silicone, or the like. In some embodiments, the inside of the thermal management component 20 is hollow to form a flow channel for fluid to circulate. The flow channel may be a serpentine-shaped flow channel, a parallel flow channel, or other flow channel structures well known to a person skilled in the art. As such, the length of the flow channel is relatively long, and the fluid can fully transfer heat with each battery cell 10 in the process of circulating in the flow channel. The fluid may be a gas or a liquid. For example, the fluid may be water, air, or the like.

The thermal management component 20 transfers heat with the battery cell 10, and the thermal management component 20 may be a material with high thermal conductivity, such as iron or aluminum. As such, the heat generated by the battery cell 10 can be transferred to the fluid in the thermal management component 20 through the thermal management component 20 in a timely manner, temperature of the fluid increases, and temperature of the battery cell 10 decreases. This implements temperature lowering of the battery cell 10.

To optimize the heat dissipation effect, the thermal management component 20 may be a plate-shaped structural member and is attached to part of an outer wall surface of the battery cell 10. The thermal management component 20 may be attached to any outer wall surface of the battery cell 10, for example, a bottom wall 12 of the battery cell 10, to transfer heat with the thermal management component 20.

In some implementations, an accommodating portion 21 is provided on the thermal management component 20, and the accommodating portion 21 is formed by the thermal management component 20 being recessed in a direction leaving the battery cell 10. As such, the battery cell 10 may extend into and support the accommodating portion 21. In this case, part of the outer wall surface of the battery cell 10 transfers heat with an inner wall surface of the accommodating portion 21. For example, the bottom wall 12 and part of the side wall 11 of the battery cell 10 may transfer heat with the inner wall surface of the accommodating portion 21 simultaneously. A heat transfer area between the battery cell 10 and the accommodating portion 21 is increased, and the battery cell 10 has a good heat dissipation effect, preventing the battery 1 from being damaged by heat.

In some implementations, the battery cell 10 is provided in plurality, and the plurality of battery cells 10 include at least a first battery cell 101 and a second battery cell 102 that are arranged adjacently, and temperature of the first battery cell 101 is higher than temperature of the second battery cell 102 before heat transfer. An accommodating portion 21 is attached to a bottom wall and a side wall of the first battery cell 101, and a thermal management component 20 is attached to a bottom wall of the second battery cell 102.

Specifically, the plurality of battery cells 10 are arranged side by side, and the plurality of battery cells 10 are connected in a preset series/parallel manner through a busbar (not shown). As such, the current formed by each battery cell 10 may be conducted through the busbar to supply power to an apparatus.

The plurality of battery cells 10 may be divided into a plurality of groups, and each group of battery cells 10 is packaged separately to form a battery module. A plurality of battery modules is packaged to form the foregoing battery 1. In this case, each battery module may be separately provided with a thermal management component 20. In some embodiments, the plurality of battery cells 10 may alternatively be directly packaged to form the battery 1. The shape and size of the battery 1 after packaging are not limited in the embodiments of this application, as long as the battery 1 can fit into the space reserved by a vehicle for the battery 1.

As shown in FIG. 3, for example, a battery cell 10 is a prismatic cell, and a plurality of prismatic cells may be directly packaged in a protective box 40 to form the battery 1. The protective box 40 may include six side panels 41. The six side panels 41 are connected and enclose the plurality of battery cells 10. A material of the protective box 40 may be metal, plastic or the like.

It can be understood that when the thermal management component 20 is plate-shaped and is attached to the plurality of battery cells 10, the thermal management component 20 can serve as one of the side panels 41 of the protective box 40. For example, as shown in FIG. 6 to FIG. 10, the thermal management component 20 serves as a side panel 41 of the protective box 40 at the bottom in a height direction. In this case, the thermal management component 20 supports the plurality of battery cells 10.

The plurality of battery cells 10 include at least a first battery cell 101 and a second battery cell 102 that are arranged adjacently. The number of first battery cells 101 and the number of second battery cells 102 are not limited in the embodiments of this application. For example, the first battery cell 101 is provided in a quantity of one, and the second battery cell 102 is provided in a quantity of one. The first battery cell 101 is provided in a quantity of one, and the second battery cell 102 is provided in plurality. Certainly, both the first battery cell 101 and the second battery cell 102 may be provided in plurality.

When both the first battery cell 101 and the second battery cell 102 are provided in plurality, the first battery cell 101 and the second battery cell 102 are alternately arranged in an arrangement manner of n first battery cells 101 and m second battery cells 102, where n≥1, m≥1, and both n and m are integers. For example, the arrangement manner may be: three first battery cells 101, two second battery cells 102, and four first battery cells 101 are arranged in sequence. In some embodiments, the first battery cell 101 and the second battery cell 102 may be arranged adjacently in sequence, meaning that both sides of the first battery cell 101 are provided with one second battery cell 102 and both sides of the second battery 102 are provided with one first battery cell 101.

The first battery cell 101 and the second battery cell 102 may be the same battery cells, or different battery cells. The "same" herein means that the first battery cell 101 and the second battery cell 102 are basically the same in terms of chemical system, shape, size, volume, mass, energy density, and the like, while the "different" herein means that the first battery cell 101 and the second battery cell 102 have a significant difference in at least one of the chemical system, shape, size, volume, mass, energy density, and the like.

In some implementations, the first battery cell 101 may be a ternary lithium battery cell, specifically for example, a lithium nickel cobalt manganate ($LiNiMnCoO_2$, NCM) battery cell or a lithium nickel cobalt aluminate ($LiNiCoAlO_2$, NCA) battery cell, and the second battery cell 102 may be a lithium iron phosphate ($LiFePO_4$, LFP) battery cell or a lithium cobalt oxide ($LiCoO_2$) battery cell.

When the plurality of battery cells 10 are of the same type, an amount of heat generated by each battery cell 10 can be considered to be approximately the same, and a heat dissipation rate of the battery cell 10 located on the inner side is lower than a heat dissipation rate of the battery cell 10 located on the outer side. When the plurality of battery cells 10 are at least two types of battery cells, an amount of heat generated by each battery cell 10 is different, and the heat dissipation rate of the battery cell 10 located on the inner side is lower than the heat dissipation rate of the battery cell 10 located on the outer side. That means, before heat transfer with the thermal management component 20, a temperature difference between the battery cells 10 is relatively large, and the battery 1 is prone to damage.

Assuming that temperature of the first battery cell 101 is higher than temperature of the second battery cell 102 before heat transfer, in order to reduce a temperature difference between the first battery cell 101 and the second battery cell 102 after the heat transfer, the first battery cell 101 may extend into and support the accommodating portion 21, so that the bottom wall and part of the side wall of the first battery cell 101 transfer heat with the inner wall surface of the accommodating portion 21. The heat transfer area between the first battery cell 101 and the thermal management component 20 is relatively large, and the heat transfer rate is relatively high. The second battery cell 102 directly supports the thermal management component 20, and only the bottom wall of the second battery cell 102 transfers heat with the thermal management component 20. The heat transfer area is relatively small, and the heat transfer rate is relatively low.

As such, the heat dissipation rate of the first battery cell 101 is higher than the heat dissipation rate of the second battery cell 102, so that the temperature difference between the first battery cell 101 and the second battery cell 102 after heat transfer is small, that is, temperature of the battery cells 10 is relatively even, avoiding overheating or overcooling of one battery cell 10, preventing the battery 1 from being damaged, and helping improve battery performance consistency and service life consistency.

Certainly, in this case, the bottom wall of the first battery cell 101 transfers heat with the bottom wall surface of accommodating portion 21, the side wall of the first battery cell 101 transfers heat with the side wall surface of the accommodating portion 21, and the inner wall surface of the accommodating portion 21 limits a position of the bottom of the first battery cell 101. Even if the first battery cell 101 is pressed by the adjacent battery cell 10, for example, the second battery cell 102 is displaced and presses the first battery cell 101, only the part of the first battery cell 101 protruding from the accommodating portion 21 may be displaced, and the part of the first battery cell 101 located in the accommodating portion 21 is still clamped with the accommodating portion 21, meaning that the first battery cell 101 is well fastened. The battery 1 has good stability as a whole.

Depending on the number of battery cells 10, one or more accommodating portion 21 may be provided on the thermal management component 20. Certainly, when a plurality of accommodating portions 21 are provided on the thermal management component 20, recess depths of the accommodating portions 21 may be the same or different. The recess depth of the accommodating portion 21 may be proportional to the amount of heat to be transferred by the first battery cell 101. The recess depth of the accommodating portion 21 may be set according to the heat transfer requirements of different first battery cells 101.

In some implementations, each accommodating portion 21 may separately accommodate one first battery cell 101. As such, the bottom wall and the side walls of each first battery cell 101 can all transfer heat with the inner wall surface of the accommodating portion 21, and the first battery cell 101 has better performance of heat dissipation.

In some implementations, to separately cool the first battery cell 101 and the second battery cell 102, a first flow channel 22 and a second flow channel 23 are provided on the thermal management component 20, where the first flow channel 22 and the second flow channel 23 are separately configured to accommodate fluid. The first flow channel 22 and the second flow channel 23 are isolated from each other, and the first flow channel 22 and the second flow channel 23 are provided opposite the first battery cell 101 and the second battery cell 102 respectively.

When the battery 1 is working, the fluid circulates in the first flow channel 22 and the second flow channel 23 separately. In this case, the fluid circulating in the first flow channel 22 does not transfer heat with the second battery cell 102, but transfers heat only with the first battery cell 101; and the fluid circulating in the second flow channel 23 does not transfer heat with the first battery cell 101, but transfers heat only with the second battery cell 102. In this way, heat transfer efficiency between the fluid and each battery cell 10 is high, and the battery cells 10 have good performance of heat regulation.

In addition, the first flow channel 22 and the second flow channel 23 are isolated from each other. Compared to the implementation in which a plurality of battery cells 10 correspond to one flow channel, the lengths of both the first flow channel 22 and the second flow channel 23 in this embodiment are shorter, so that the fluid can be discharged in a timely manner after the heat transfer, avoiding that part of the battery cells 10 at an outlet of the flow channel cannot transfer heat sufficiently due to excessive heat absorbed by the fluid along the excessively long flow channel.

Taking into account the different costs of fluids with different thermal conductivity, in some implementations, the fluid includes a first fluid and a second fluid, where the first fluid circulates in the first flow channel 22, the second fluid circulates in the second flow channel 23, and a thermal conductivity coefficient of the first fluid is greater than a thermal conductivity coefficient of the second fluid.

In this way, the first fluid with a larger thermal conductivity coefficient corresponds to the first battery cell 101 that generates more heat or dissipates heat more slowly, and circulates in the first flow channel 22. The heat transfer between the first fluid and the first battery cell 101 is faster with more heat transferred. The second fluid with a smaller thermal conductivity coefficient corresponds to the second battery cell 102 that generates less heat or dissipates heat faster, and circulates in the second flow channel 23. The amount of heat transfer between the second fluid and the second battery cell 102 is smaller.

In other words, this embodiment uses different fluids for different battery cells 10, which can make the temperature between the battery cells 10 more even and reduce the cost.

In some implementations, the thermal management component 20 further includes a protruding portion 24. The protruding portion 24 is attached to the bottom wall 12 of the second battery cell 102. The first flow channel 22 is provided in the accommodating portion 21, and the second flow channel 23 is provided in the protruding portion 24.

The protruding portion 24 may be fastened to the thermal management component 20 by bonding or integrally formed with the thermal management component 20. Referring to FIG. 5, the protruding portion 24 may be integrally formed with the thermal management component 20. The thermal management component 20 may be a concave-convex plate structure. The protruding portion 24 and the thermal management component 20 together form a concave-convex supporting surface, making the thermal management component 20 tougher.

Alternatively, referring to FIG. 6, the protruding portion 24 may be detachably connected to the thermal management component 20. For example, a slot is provided on the thermal management component 20, and the protruding portion 24 is plug-connected to the thermal management component 20.

After the protruding portion 24 is connected to the thermal management component 20, a portion of the thermal management component 20 on which no protruding portion 24 is provided forms the accommodating portion 21.

When the first battery cell 101 is provided in the accommodating portion 21, the bottom wall 12 of the first battery cell 101 transfers heat with the thermal management component 20, and the side wall 11 of the first battery cell 101 transfers heat with the side wall surface of the protruding portion 24, so that the first battery cell 101 can transfer heat with the fluid in the first flow channel 22 and the second flow channel 23 at the same time, achieving a high heat transfer efficiency. The second battery cell 102 is supported by the protruding portion 24, and the second battery cell 102 transfers heat with the fluid in the second flow channel 23. In this way, temperature of the first battery cell 101 and the second battery cell 102 can be regulated to a preset temperature range, and the temperature difference between the first battery cell 101 and the second battery cell 102 is relatively small, so as to prevent damaging the battery 1 by an overheat battery cell 10.

In some implementations, the battery 1 further includes a support member 30. The support member 30 is configured to support the battery cell 10, and the support member 30 is connected to the thermal management component 20.

The support member 30 may be an elastic member. The support member 30 may be provided between the battery cell 10 and the thermal management component 20, may be provided in the thermal management component 20, or may be provided at the bottom of the thermal management component 20. In this way, the shock absorption and impact resistance performance of the battery cell 10 and the battery 1 can be improved. The elastic member may be a spring, elastic rubber, or the like, which is not limited in this embodiment.

Each battery cell 10 may be correspondingly provided with one support member 30, so as to cushion and absorb shock for each battery cell 10.

In order to fasten the support member 30, an accommodating groove 25 is provided on the thermal management component 20. The accommodating groove 25 is configured to accommodate the support member 30.

In this way, when the battery 1 suffers impact and the battery cell 10 is displaced relative to the thermal management component 20, the support member 30 can be elastically deformed in the accommodating groove 25. In this case, the accommodating groove 25 may play a guiding role to prevent the support member 30 from tilting in the process of deformation, so as to prevent the battery cell 10 from tilting.

The number of accommodating grooves 25 may be less than the number of battery cells 10 to avoid excessively reducing the strength of the thermal management component 20 due to too many accommodating grooves 25.

In some implementations, referring to FIG. 5, the thermal management component 20 has a concave-convex plate structure. In this case, a concave part of the thermal management component 20 back away from the battery cell 10 may form an accommodating groove 25. The support member 30 may support or be filled in the accommodating groove 25, and protect the battery 1 to alleviate the external vibration and impact on the battery 1.

Certainly, referring to FIG. 9 and FIG. 10, an accommodating groove 25 may alternatively be a structure with open ends disposed in the thermal management component 20, which is not limited in this embodiment.

An embodiment of this application further provides a manufacturing method of battery 1, to prepare the battery 1. The method includes the following steps.

S100. Provide battery cells 10. The battery cell 10 has a bottom wall 12 and a side wall 11 that are connected.

S200. Provide a thermal management component 20, and form an accommodating portion 21 on the thermal management component 20.

S300. Assemble the battery cells 10 and the thermal management component 20. The bottom of a first battery cell 101 in a height direction is inserted into the accommodating portion 21, and the bottom of a second battery cell 102 in the height direction is directly supported on the thermal management component 20. In this way, the accommodating portion 21 is attached to the bottom wall 12 and the side wall 11 of the battery cell 10, and a heat transfer area between the first battery cell 101 and the thermal management component 20 is larger than a heat transfer area between the second battery cell 102 and the thermal management component 20, so that a temperature difference between the first battery cell 101 and the second battery cell 102 after heat transfer is small and temperature of the battery cells 10 is even, preventing the battery 1 from being damaged by overheating or overcooling.

An embodiment of this application further provides a manufacturing device of battery 1, configured to prepare the foregoing battery 1. The device includes: a battery cell preparation module, configured to prepare a battery cell 10; a thermal management component preparation module, configured to prepare a thermal management component 20, and form an accommodating portion 21 on the thermal management component 20; and an assembling module, configured to install the battery cell 10 in the accommodating portion 21 of the thermal management component 20.

The battery cell preparation module, the thermal management component preparation module, and the assembling module may be separate parts or may be an integral part of the manufacturing device, which is not limited in this embodiment.

Specifically, during preparation of the battery 1, the battery cell 10 and a thermal management component 20 are first prepared through the battery cell preparation module and the thermal management component preparation module, and an accommodating portion 21 is formed on the thermal management component 20.

The assembling module can attach the battery cell 10 to the thermal management component 20. In this case, part of the battery cell 10 extends into the accommodating portion 21, and another part of the battery cell 10 is directly supported on the thermal management component 20, so that heat transfer areas of these two parts of the battery cell 10 with the thermal management component 20 are different, making temperature of each battery cell 10 more even and prevent the battery 1 from being damaged by overheating or overcooling.

Although this application has been described with reference to the preferred embodiments, various modifications can be made to this application without departing from the scope of this application and the components therein can be replaced with equivalents. In particular, in absence of structural conflicts, the technical features mentioned in the embodiments can be combined in any manner. This application is not limited to the specific embodiments disclosed in this specification, but includes all technical solutions falling within the scope of the claims.

What is claimed is:

1. A battery, comprising:
 a plurality of battery cells each with a side wall and a bottom wall that are connected, wherein the plurality of battery cells comprise at least a first battery cell and a second battery cell that are arranged adjacently; and
 a thermal management component, configured to accommodate fluid to regulate a temperature of each of the plurality of battery cells, wherein an accommodating portion is provided on the thermal management component, and configured to accommodate the battery cell, wherein the accommodating portion is attached to the bottom wall and side wall of the first battery cell and the thermal management component is attached to the bottom wall of the second battery cell;

wherein a first flow channel and a second flow channel are provided on the thermal management component, the first flow channel and the second flow channel are separately configured to accommodate the fluid, the first flow channel and the second flow channel are isolated from each other, and the first flow channel and the second flow channel are provided opposite the first battery cell and the second battery cell, respectively.

2. The battery according to claim 1, wherein temperature of the first battery cell is higher than temperature of the second battery cell before heat transfer.

3. The battery according to claim 1, wherein the fluid comprises first fluid and second fluid, the first fluid circulates in the first flow channel, the second fluid circulates in the second flow channel, and a thermal conductivity coefficient of the first fluid is greater than a thermal conductivity coefficient of the second fluid.

4. The battery according to claim 1, wherein the thermal management component further comprises a protruding portion, and the protruding portion is attached to the bottom wall of the second battery cell; and the first flow channel is provided in the accommodating portion, and the second flow channel is provided in the protruding portion.

5. The battery according to claim 1, wherein the battery further comprises a support member, wherein the support member is configured to support the battery cell, and the support member is connected to the thermal management component.

6. The battery according to claim 5, wherein an accommodating groove is provided in the thermal management component, and the accommodating groove is configured to accommodate the support member.

7. An apparatus using a battery, comprising the battery according to claim 1, wherein the battery supplies electrical energy to the apparatus.

8. A manufacturing method of batteries, used for manufacturing the battery according to claim 1, comprising:

providing a battery cell, wherein the battery cell has a side wall and a bottom wall that are connected;

providing a thermal management component, and forming an accommodating portion on the thermal management component; and assembling the battery cell and the thermal management component so that the accommodating portion is attached to the bottom wall and side wall of the battery cell, to implement heat transfer between the battery cell and the thermal management component.

* * * * *